United States Patent [19]

Mullersman

[11] 4,213,079
[45] Jul. 15, 1980

[54] BATTERY CHARGER ADAPTER

[75] Inventor: Ferdinand H. Mullersman, Gainesville, Fla.

[73] Assignee: General Electric Company, Worthington, Ohio

[21] Appl. No.: 877,299

[22] Filed: Feb. 13, 1978

[51] Int. Cl.² .................. H01M 10/46; H02J 7/00
[52] U.S. Cl. .............................. 320/2; 320/25; 339/228; 429/121
[58] Field of Search ............... 320/2, 3, 4, 25; 429/1, 429/7-9, 96, 97, 100, 121, 163; 339/184 M, 278 M, 29 B, 228, 256 R, 256 RT, 258 R, 258 A, 184

[56] References Cited

U.S. PATENT DOCUMENTS

| 3,665,285 | 5/1972 | Mullersman et al. ............. 320/2 |
| 3,980,388 | 9/1976 | Nailor ..................... 339/256 RT X |

FOREIGN PATENT DOCUMENTS 212453 12/1960 Austria ........................................ 320/2

OTHER PUBLICATIONS

Published Specification Ser. No. 427,480, pub. 6/43 by Alien Property Custodian, Inventor-Zdansky.

*Primary Examiner*—Robert J. Hickey
*Attorney, Agent, or Firm*—Morgan, Finnegan, Pine, Foley & Lee

[57] ABSTRACT

A charger adapter includes a two element housing wherein each of the elements carry snap fit terminals. The elements are positioned in juxtaposition to define an internal cavity for holding current limiting circuitry. The elements may be joined by a hinge to form a unitary structure. One surface of the housing includes an alignment wall and index for aligning battery terminals with the adapter terminals.

An alternative one piece housing is also described.

19 Claims, 14 Drawing Figures

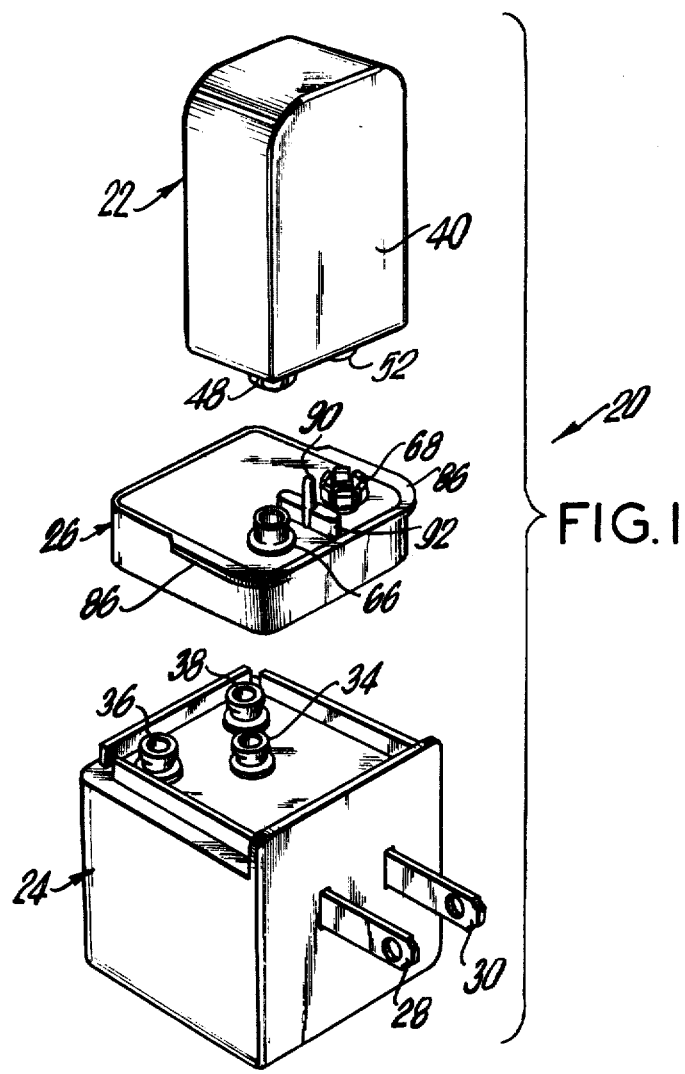
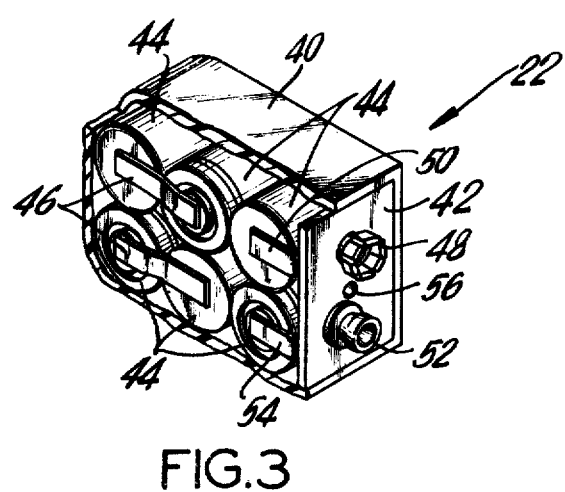
FIG.1
FIG.3

BATTERY CHARGER ADAPTER

CROSS REFERENCE TO RELATED APPLICATIONS

This application is related to the following commonly assigned applications filed contemporaneously herewith: Ser. No. 878,453; Ser. No. 877,281 and Ser. No. 877,297.

BACKGROUND OF THE INVENTION

This invention relates to rechargeable batteries and more particularly to a simple, inexpensive, charging system whereby a rechargeable battery of the 9 volt physical size and/or electrical characteristics are selectively and alternatively connectible to a charge current source for recharging of the type described in U.S. Pat. No. 4,009,429.

There is an increasing number of consumer products being operated by rechargeable cells such as nickel-cadmium cells. These products require cells with a plurality of physical sizes and electrical characteristics. The variety of cell types in wide use in the consumer market has given rise to the need to provide a unitary charging device to accommodate the various cell types. One such device is described in U.S. Pat. No. 3,579,075 issued on May 18, 1971 and assigned to the assignee of the invention herein. While this device provides a viable approach for charging cells of a variety of types, it has failed to achieve widespread adoption in the consumer market because of its complexity and cost of construction. The system described in the above-identified U.S. Pat. No. 4,009,429 is useful in charging AA, C & D size batteries, but does not accept 9 volt size batteries. The application Ser. No. 877,297 discloses an improvement on this system for charging rechargeable 9 volt batteries.

SUMMARY

The present invention is an improvement on the charge adapter of the system described in Ser. No. 877,297 whereby 9 volt size batteries may be charged.

More specifically, the present invention is directed to a charging adapter comprising a housing including a first portion and a second portion, said first and second portion having juxtaposed surfaces defining a cavity; a pair of contact terminals extending from each of said portions at locations thereon remote from said juxtaposed surfaces; circuit means in said cavity means for electrically coupling one contact of one pair to one contact of the other pair.

Additionally, alignment means are disclosed to present the battery contacts in register with the terminal contact.

A modified one piece housing is also described.

BRIEF DESCRIPTION OF THE DRAWINGS

FIG. 1 is an exploded, perspective view of a charge current source, an adapter and a 9 volt battery of the present invention;

FIG. 3 is a perspective view of a 9 volt size battery with portions broken away for clarity of illustration;

DETAILED DESCRIPTION

Figure 2:
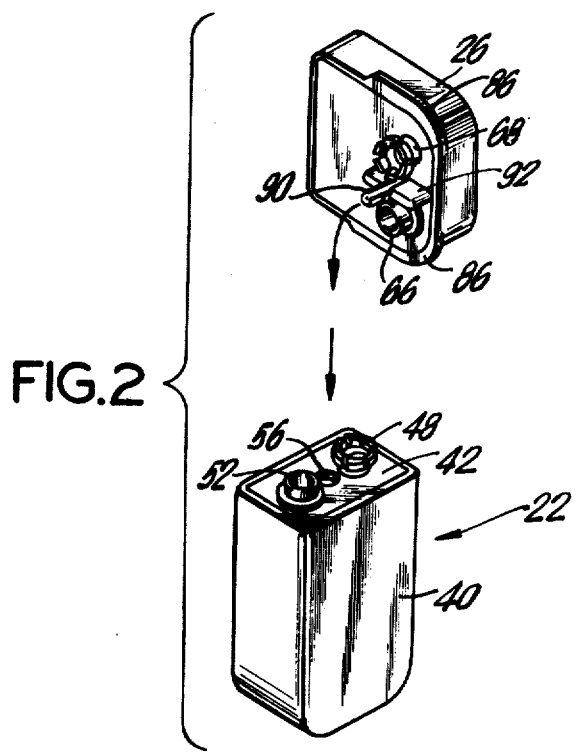
FIG. 2 is an exploded, perspective view of a 9 volt size battery and adapter with the adapter rotated 90°.

While this invention is susceptible of embodiment in many different forms, there is shown in the drawings and will hereinafter be described in detail a preferred embodiment of the invention, and modifications thereto, with the understanding that the present disclosure is to be considered as an exemplification of the principles of the invention and is not intended to limit the invention to the embodiments illustrated.

The overall system 20 is shown in FIG. 1. System 20 includes a rechargeable battery 22, a source 24 and an adapter 26. FIG. 1 is an exploded perspective view of the components of the system when assembled for charging.

The Charge Source

Figure 14:
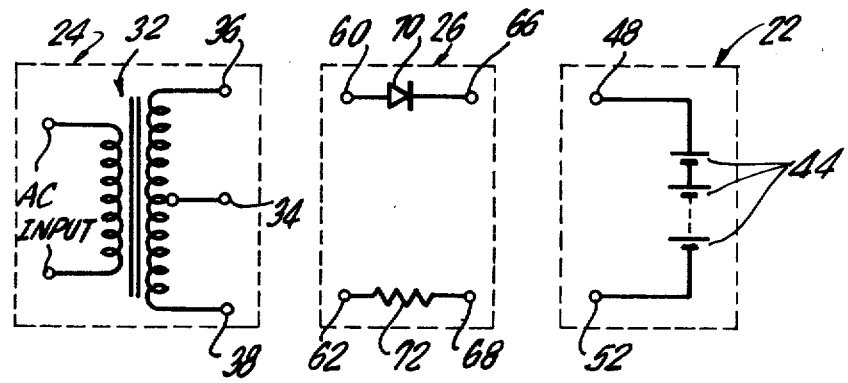
FIG. 14 is a circuit diagram of the charger, adapter and battery.

The charge current source 24 is comprised of a conventional high impedance center tapped transformer, which is illustrated schematically in FIG. 14 by block 24. Two blades 28, 30 are provided in one face of the charger housing for connection to a source of 120 VAC. Source 24 is available commercially from the assignee, General Electric Company, under the designation BC3 miniature charger, and is described in the above-identified U.S. Pat. No. 4,009,429.

As shown in FIG. 14, the source 24 comprises a transformer 32 to make available from the standard 110–120 volt cycle AC line an output current of appropriate magnitude for the load provided. Terminal 34 is centrally tapped to the secondary of transformer 32, while terminals 36 and 38 are end tapped to the secondary of the transformer.

As shown in FIG. 1, terminals 34, 36 and 38 are one-way, snap-type "male" terminals attached to a face of source 24.

The Rechargeable Battery

Rechargeable battery 22, FIG. 3, includes a generally rectangular shaped housing 40 which is open at one end and closure end plate 42 which may be formed of an insulating plastic material such as polystyrene. End plate 42 is joined to housing 40 by means of adhesive or ultrasonic welding techniques.

Battery 22 is sized for 9 volt usage in its physical dimensions and includes 6 rechargeable nickel cadmium cells 44 having a nominal voltage of 1.25 V.D.C. The cells 44 are connected in series by conductive straps 46 (only two are illustrated).

The first cell 44 is connected to a female one-way snap terminal 48 carried on end plate 42 by conductive strip 50. The last cell 44 of the series is connected to a male one-way snap terminal 52 by conductive strap 54 to complete the electrical circuit of the battery, as shown in FIG. 14.

Figure 4:
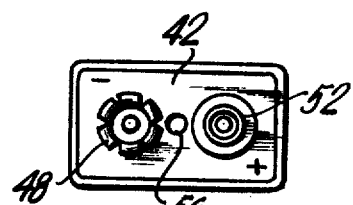
FIG. 4 is an end view of the battery of FIG. 3.

Since battery 22 is rechargeable and of the physical size of ordinary non-rechargeable 9 volt batteries, it is preferred to have securing means on the battery which cooperate with adapter 26 to permit only rechargeable battery to be used therewith. To this end an aperture 56 is provided in end plate 42 between the terminals 48 and 52, see FIG. 4. As described below, this aperture 56 allows battery 22 to be attached to adapter 26, but not ordinary batteries.

The Adapter

Adapter 26 is the bridging element between source 24 and battery 22 and serves two functions; namely, physically attaching or mounting the battery and electrically connecting the terminals 36 and 38 of the charger to terminals 48 and 52 of the battery.

Figure 5:
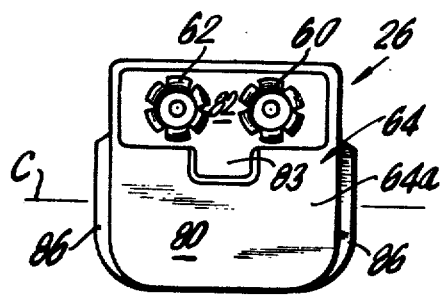
FIG. 5 is a bottom plan view of the adapter.
Figure 6:
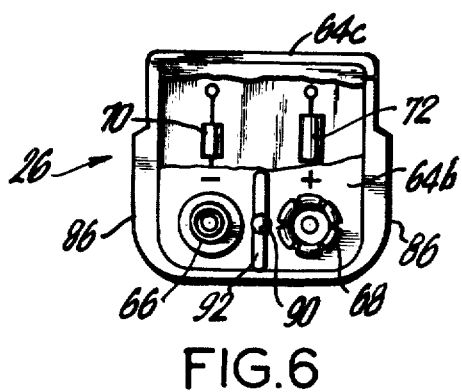
FIG. 6 is a top plan view of the adapter with certain portions broken away for clarity of illustration.

To these ends, adapter 26 includes a pair of one-way female snap terminals 60, 62 attached to one surface of housing 64, see FIG. 5, which interconnect with charger terminals 36 and 38, and on an opposite surface a second set of one-way snap terminals, a male terminal 66 and female terminal 68, FIG. 6, which interconnect with battery terminals 48 and 52, respectively. The one-way snap type terminal not only provides electrical contact but also mechanical gripping to support the battery on the charger.

Electrical circuitry is carried by the adapter to provide suitable conditioning of the source to battery characteristic by current and voltage control. To this end rectifying means, particularly a half-way rectifier 70, such as a diode, is connected between terminals 60 and 66 and a resistor 72 is connected between terminal 62 and 68 to produce the circuit shown in FIG. 14. It will be appreciated by those skilled in the art that other arrangements of electrical components may also be utilized to provide suitable conditioning of the source to the battery.

Figure 7:
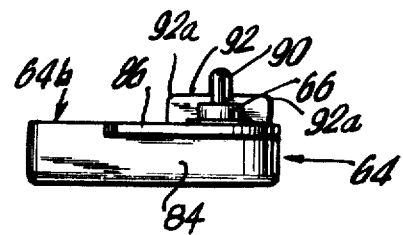
FIG. 7 is a side elevation view of the adapter.

Adapter housing 64 is preferably of a molded plastic construction and may be fabricated in a number of methods and configurations as described herein. The adapter housing shown in FIGS. 5-7 has a fully enclosed structure formed by a housing portion 64a and closure portion 64b. Portion 64a and 64b may be separately molded pieces or integrally joined by a hinge 64c.

Housing portion 64a includes a contoured bottom surface. Bottom surface as used herein refers to the surface which abuts against the charger, and top surface refers to the surface of the adapter which abuts against the battery when the system components are assembled for charging, FIG. 1. The contoured bottom, FIG. 5, contains a flat portion 80 and a recessed portion 82 wherein terminals 60 and 62 are located. Recessed portion 82 also includes a clearance area 83 to receive terminal 34 therein when the adapter 26 is positioned on charger 24. Side walls 84 extend upwardly from bottom surface 80 to define an internal cavity for receipt of diode 70 and resistor 72.

Closure portion 64b has a generally flat surface and carries terminals 66 and 68 thereon. Portion 64b is joined to portion 64a by the use of adhesive or ultrasonic bonding techniques.

Finger Grips

A pair of laterally extending finger grips 86 are provided at the top edge of portion 64a. Grips 86 are positioned such that their centers, shown by line C, are offset from the center line of terminals 60 and 62. In this manner, when the grips 86 are manually grasped and pulled, a moment or torque about terminals 60 and 62 is produced to facilitate removal of the adapter from the charger terminals 36 and 38.

Adapter Safety Interface

As discussed above, only rechargeable batteries can be utilized in the system. To cooperate with the aperture 56 in end plate 42 of the battery, an index means or key in the form of an upwardly extending projection 90 is provided on adapter 26 between terminals 66 and 68.

As best illustrated in FIG. 2, when the terminals of battery 22 are snap-fitted to the terminals of adapter 26, key 90 passes through aperture 56. It will be appreciated that the combination of aperture 56 and key 90 function to allow only rechargeable batteries of the type shown in FIG. 4 to be connected since projection 90 will contact the end plate of non-conforming batteries and prevent their connection to the adapter.

Since terminals 66, 68 and 48, 52 are snap type, it is advantageous to provide battery removal assist means to the adapter 26. To this end, upstanding fulcrum or wall 92 is provided between terminals 66 and 68. Wall 92 is equidistant and perpendicular to the terminal centerlines and of a height such that the battery terminal may be attached to the charger terminals and the top surface of wall 92 abuts against end plate 42. In this manner, when the battery is to be removed from the adapter, it is pivoted in the plane of wall 92 so that one of the top end edges 92a act as a fulcrum to assist in separating the battery from the adapter.

Adapter With Battery Alignment Means

Figure 8:
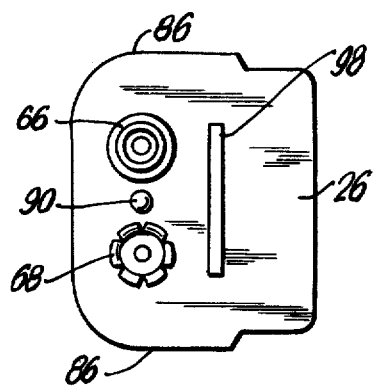
FIG. 8 is a top plan view of an alternative adapter with a battery alignment wall.
Figure 9:
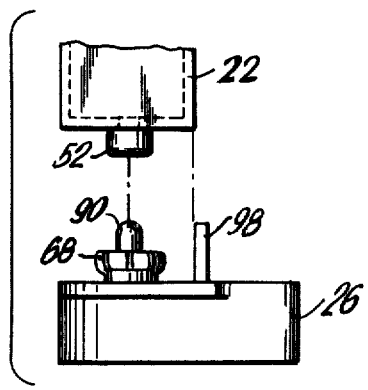
FIG. 9 is a side elevation view of the adapter of FIG. 8 and part of a 9 volt battery illustrating the operation of the alignment wall.

In order to avoid damage to the terminals of the battery 22 and adapter 26 arising from continual interconnection, it is advantageous to provide means for accurately aligning the respective terminals prior to engagement. To this end, the adapter 26, FIGS. 8 and 9, includes a safety key 90 of the type described above and an upstanding alignment wall 98. Wall 98 is parallel to the centerline of terminals 66 and 68 and spaced therefrom a distance sufficient to contact and guide the side of the battery 22 into terminal engagement. The combination of key 90 and wall 98 thereby functions to accurately align terminals 66 and 68 with terminals 48 and 52 during mating and militate against damage thereto from repeated mating.

One-Piece Adapter Housing

Another form of adapter 226 is illustrated in FIGS. 10-13. Adapter 226 is a single injection molded element which is formed with contoured compartments. The one piece adapter body includes a first horizontal support element 267, which carries terminals 60 and 62 on one surface and diode 70 and resistor 72 on the opposite surface. A second horizontal support element 269 is spaced upwardly from element 267, see FIG. 12, and defines a gap between its end edge 271 and the end edge 275 of element 267. Element 269 carries terminals 66 and 68 as well as having formed thereon key 90 and fulcrum wall 92.

Figure 11:
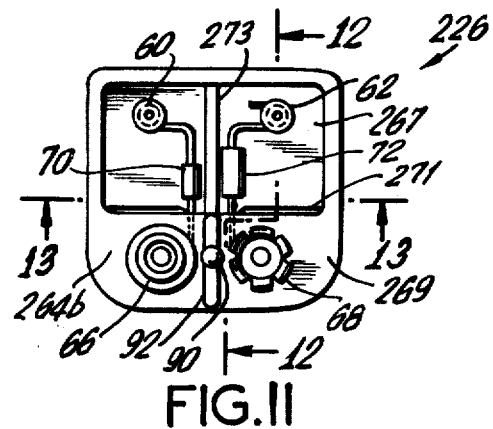
Figure 12:
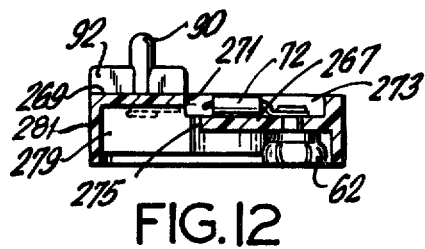
FIGS. 12 and 13 are cross-sectional views taken along lines 12—12 and 13—13, respectively, in FIG. 11.
Figure 13:
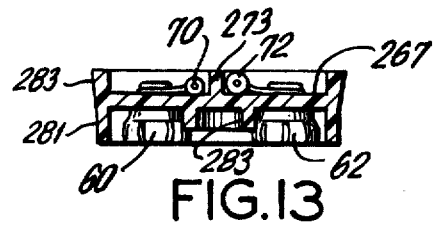

With particular reference to FIGS. 11 and 13, the diode 70 circuit and resistor 72 circuits are isolated by means of a longitudinally extending wall 273 on the top surface of element 267. The resistor and diode are positioned and held against the surfaces of wall 273 and element 267 at the corner junction thereof. The lead wires pass through the gap at edges 271 and 275.

Figure 10:
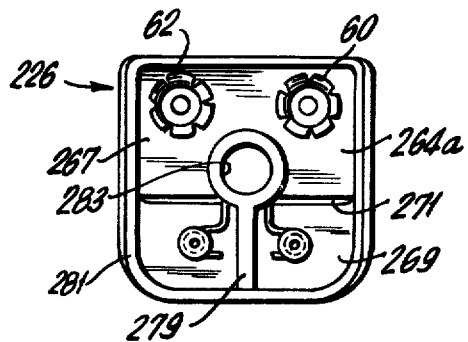
FIGS. 10 and 11 are bottom and top plan views of a third alternative adapter.

The diode 70 and resistor 72 lead wires are also separated on element 269 by a longitudinal wall 279, FIG. 10, which joins with a circular receiving wall 283 for charger terminal 34.

The entire bottom periphery of the adapter is surmounted by a wall 281 and the top surface of element 267 is surmounted by a peripheral wall 283 to produce a side enclosed adapter as shown in FIG. 13. Advantageously, the longitudinal sections of wall 283 taper outwardly and are textured to facilitate manual gripping.

These and other modifications may be made to the invention without departing from the scope and spirit thereof as pointed out in the appended claims.

What is claimed is:

1. A charging adapter comprising a housing including a top portion and a bottom portion, said top and bottom portions having juxtaposed surfaces defining a cavity therebetween; said bottom portion having a first portion and a recessed portion, a pair of snap-type terminal contacts in said recessed portion; a pair of contact terminals extending from said top portion; circuit means in said cavity for electrically coupling one contact of one pair to one contact of the other pair.

2. A charging adapter of claim 1, wherein said housing means is an insulating material.

3. A charging adapter of claim 2, wherein said housing means is a moldable plastic material.

4. A charging adapter of claim 1, wherein said top and bottom portions are interconnected by a hinge.

5. A charging adapter of claim 1, wherein said circuit means includes rectification means.

6. A charging adapter of claim 1, wherein said circuit means includes a diode.

7. A charging adapter of claim 1, wherein said circuit means includes current limiting means.

8. A charging adapter of claim 1, wherein said circuit means includes a diode and resistor arranged in series.

9. A charging adapter of claim 8, wherein said diode is arranged between associated contacts of each pair and said resistor is arranged between the other associated contacts of each pair.

10. A charging adapter of claim 1, wherein said contact terminals are snap-type terminals.

11. A charging adapter of claim 1, wherein one pair of said terminals is adapted and arranged to receive a multiple cell battery.

12. A charger adapter of claim 1, wherein said recessed portion further includes a clearance area, said clearance area being arranged to receive a snap-type terminal.

13. In a charging adapter for charging a rechargeable battery having an index receiving means, and said charging adapter having terminal contacts adapted and arranged to receive the terminal contacts of said battery and index means operative with said battery index receiving means to permit interconnection of said terminals, wherein the improvement comprises battery alignment wall means extending from said charging adapter, said alignment means being parallel to the centerline of said terminal contacts and spaced therefrom a sufficient distance to contact and guide the side of said battery, said alignment means cooperating with said index means to cause the terminal contacts of the battery to be in register with the terminal contacts of the charging adapter when said battery is interconnected with said charging adapter.

14. A charging adapter comprising a one-piece plastic body, said body having first horizontal support having a first pair of terminal contacts extending from a surface thereof, and a second horizontal support vertically offset from said first horizontal support and defining a gap therebetween having a second pair of terminal contacts extending from a surface thereof opposite said first pair of terminal contacts; and a first vertical partition wall extending from said first wall across said first support on the surface opposite said first terminal contacts and a second partition wall colinear with said first wall on the opposite surface of said second support, said first and second partition walls bisecting the centerlines of said first and second pairs of terminal contacts, circuitry means carried on said first support surface opposite said first terminal contacts and abutting said first partition wall, said circuitry means interconnecting associated terminal contacts of said first and second pairs and passing through said gap between first and second supports.

15. The adapter of claim 14, further including a circular shaped wall defining a terminal receiving area therein and located on said first horizontal support.

16. The adapter of claim 14, wherein said body further includes peripheral walls surmounting said first and second horizontal supports.

17. The adapter of claim 14, wherein said contact terminals are snap-type terminals.

18. The adapter of claim 14, wherein said circuit means include a diode.

19. The adapter of claim 14, wherein said circuit means include current limiting means.

* * * * *